United States Patent [19]

Waldron et al.

[11] Patent Number: 4,692,114
[45] Date of Patent: Sep. 8, 1987

[54] VAPOR LEVEL CONTROL FOR VAPOR PROCESSING SYSTEM

[75] Inventors: Gerald E. Waldron, Foxboro; Edward J. Wilson, Wilmington, both of Mass.

[73] Assignee: Dynapert-HTC Corp., Farmington, Conn.

[21] Appl. No.: 844,396

[22] Filed: Mar. 26, 1986

[51] Int. Cl.⁴ .............................................. F23D 5/00
[52] U.S. Cl. .................................. 432/198; 228/102; 228/242; 432/23
[58] Field of Search ..................... 432/23, 24, 198, 59, 432/8; 228/219, 259, 242, 102

[56] References Cited

U.S. PATENT DOCUMENTS

| 3,904,102 | 9/1975 | Chu et al. | 228/242 X |
| 3,965,855 | 6/1976 | Weiler | 432/59 X |
| 4,032,033 | 6/1977 | Chu et al. | 228/242 X |
| 4,165,964 | 8/1979 | Yonezawa et al. | 432/59 |
| 4,549,686 | 10/1985 | Sargent et al. | 228/242 |
| 4,589,956 | 5/1986 | Westby | 228/102 X |

Primary Examiner—Edward G. Favors
Attorney, Agent, or Firm—Spencer T. Smith

[57] ABSTRACT

A vapor processing system which has a vessel for containing a processing vapor generated by heating electronic fluid contained within the vessel. A selected saturated vapor zone level is devined for work product delivered to the vapor zone by generating a signal representative of the actual temperature at one of a plurality of spaced locations within the vessel, generating a signal representative of the desired temperature at the selected location for a saturated vapor zone having a level selected for the work product being conveyed to the saturated vapor zone, and comparing the signals representative of the actual and desired temperatures at the selected location and for varying the output of the heater to change the actual sensed temperature to the desired temperature so that the actual saturated vapor zone level will conform to the desired saturated vapor zone level.

5 Claims, 3 Drawing Figures

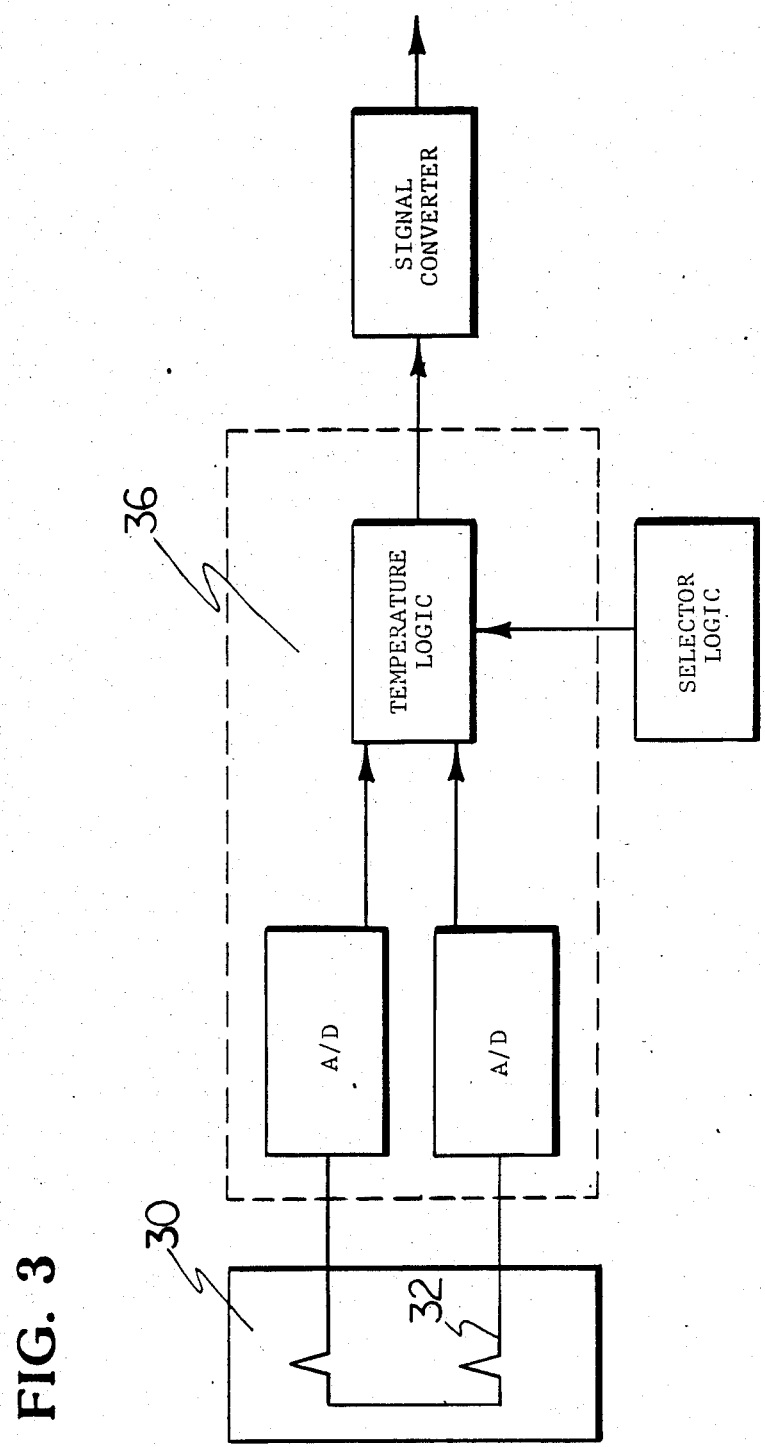

4,692,114

VAPOR LEVEL CONTROL FOR VAPOR PROCESSING SYSTEM

In a vapor phase processing system, a contained electronic liquid is heated by heaters to generate a zone of saturated vapor. Work product is delivered to the saturated vapor zone and is retained within this zone until processing (soldering, for example) is completed.

It is an object of the present invention to lower the level of the vapor to the minimum level required to properly process the work product by controlling the output of the heater for the electronic liquid. Such a reduction will reduce the amount of saturated vapor, and accordingly, will reduce energy use and vapor losses.

Other objects and advantages of the present invention will become apparent from the following portion of the specification and from the following drawings which illustrate in accordance with the mandate of the patent statutes a presently preferred embodiment incorporating the principles of the invention.

Referring to the drawings:

FIG. 2 is a schematic diagram illustrating the structure for controlling the vapor level of the system shown in FIG. 1; and.

FIG. 3 is a schematic diagram illustrating an alternate embodiment of the height selector illustrated in FIG. 2.

Figure 1:
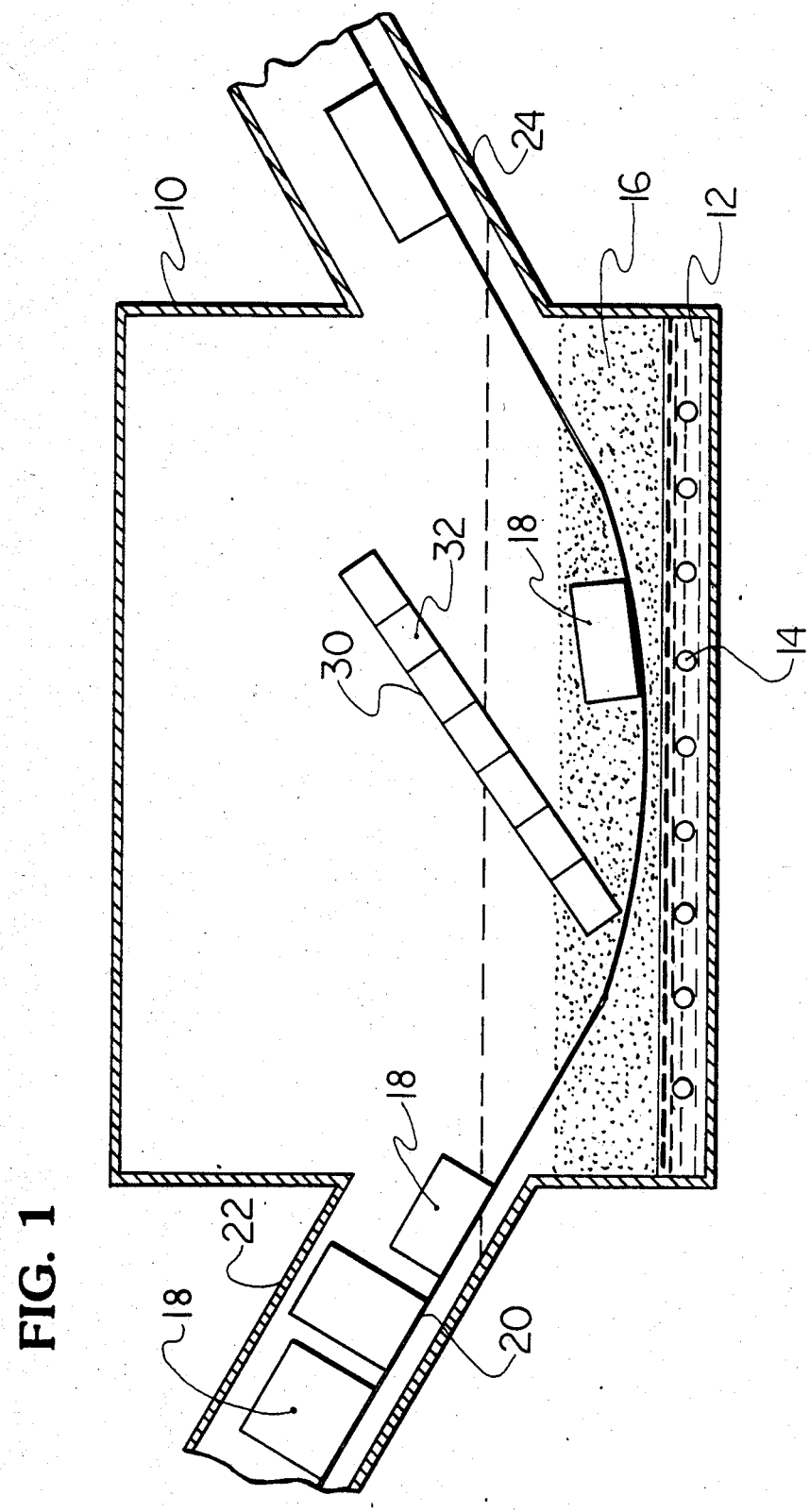
FIG. 1 is a cross-sectional view of a vapor phase system made in accordance with the teachings of the present invention.

A vapor phase processing system includes a vessel or tank 10 which contains an electronic liquid 12 such as liquids sold by 3M under the Trademark "FLUORINERT". The contained electronic liquid 12 is heated by heaters 14 which in this embodiment are located within the electronic liquid 12 to generate a zone 16 of saturated vapor. Work product 18, which may have a variety of shapes, is placed on a conveyor 20 which carries the work product 18 through the inlet throat 22 to the saturated vapor zone 16 for processing and carries the processed work product 18 through the exit throat 24 to a pick up location.

Figure 2:
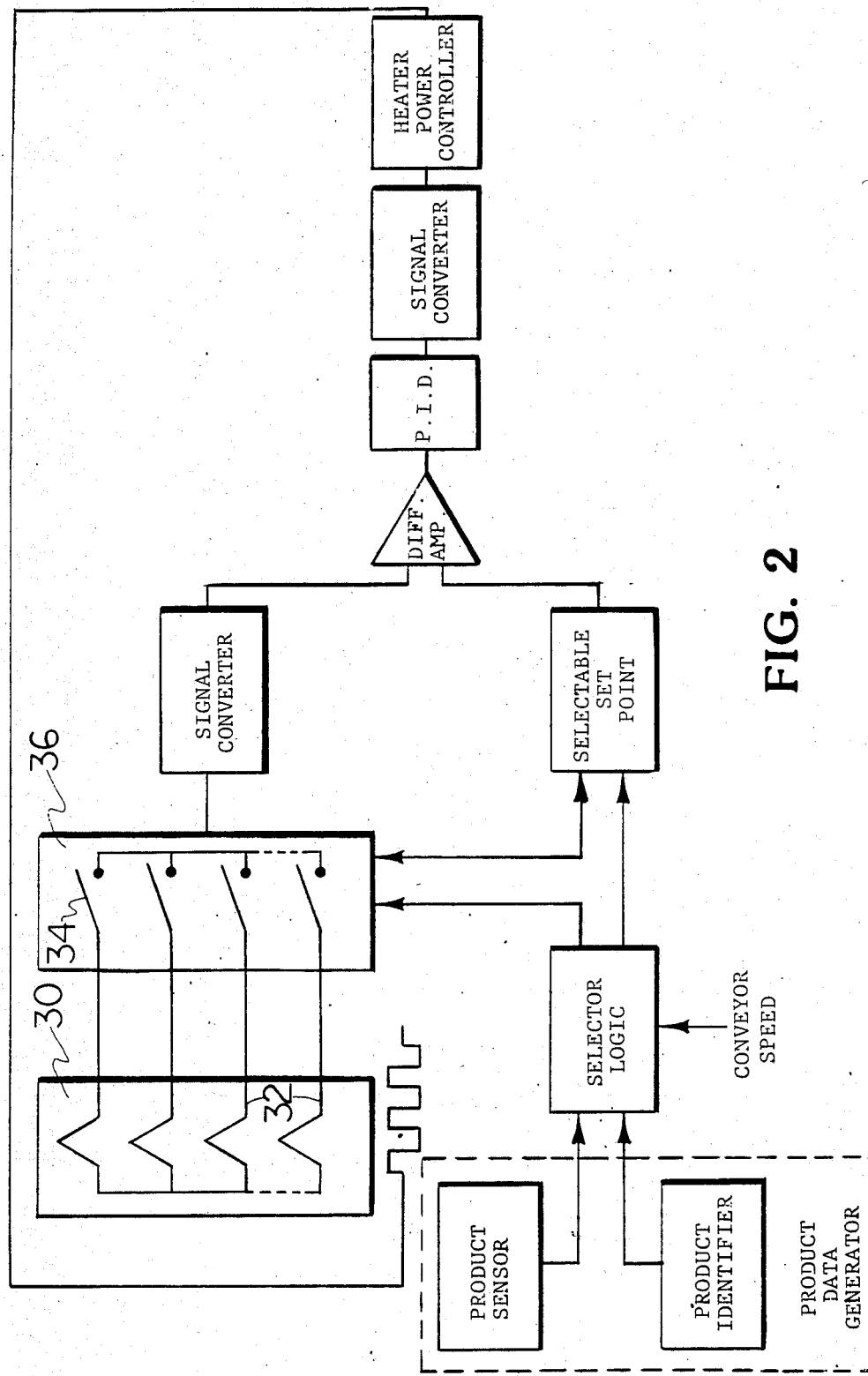

A straight linear array of temperature sensors 30 in the form of discrete thermocouple elements 32 is inclined from the vertical to sense existing temperatures at specific spaced locations within the vessel 10. In the preferred embodiment, these locations are vertically spaced, but the array might extend horizontally or along a curve. As can be seen from FIGs. 2, each thermocouple 32 of the array 30 is connected to an associated switch 34 in a selectably setable height selector 36. The height selector 36 may be manually set or set by Selector Logic which operates on data received from a Product Data Generator which can include a Product Sensor for sensing work product at a specific position as it is conveyed through the system. The Product Sensor can, in its simplest form, be an optical switch operated when the work product interrupts the beam of light. The Product Data Generator may also include a Product Identifier which, in its simplest form, can be a thumb wheel switch manually setable to identify the specific work product being processed. Both functions could also be performed by a bar code reader. The Product Data Generator could also be an optical scanning array (not shown) which not only could sense the presence of the work product by locating its leading edge, but could also sense the trailing edge and top surface of the work product, thereby providing the Selector Logic directly with required dimensional data. The Selector Logic, based on this information, as well as on other information such as conveyor speed, determines the height of the vessel 10 at which the actual temperature is to be read (which thermocouple element is to be read) and when and sets the Selectable Set Point at the temperature which that thermocouple should sense if the saturated vapor zone has the desired minimum level for processing the work product. The Selectable Set Point may, optionally be manually setable. The output signal from the height selector 36 which is converted by a Signal Converter, is delivered with the Selectable Set Point signal to a difference amplifier which supplies a Proportional-Integrator-Derivative Controller (PID). The output of the PID, which is representative of a difference between the actual and desired temperatures at the selected vessel height and which is converted by a Signal Converter, is supplied to the Heater Power Controller to control heater power to eliminate any difference between the actual and desired temperatures at the selected vessel height.

Alternately, the temperature sensor 30 may include two vertically spaced thermocouple elements 32 (FIG. 3). The bottom one of these elements is located at a height which is just above the lowermost level of saturated vapor, and the top element is located just above the uppermost level of saturated vapor. The sensed temperatures are supplied via Signal converters to Temperature Logic which takes a weighted average of these two signals representative of the temperature at a given height defined by the Selector Logic. The height selector 36, accordingly, supplies the Signal Converter with a signal representative of the temperature at a selected vessel height between the two thermocouple elements.

What is claimed is:

1. A vapor processing system comprising:
   a vessel for containing a processing vapor,
   heater means for heating an electronic liquid contained within said vessel to establish a saturated vapor zone, said heater means having a variable output,
   means for conveying work product to the saturated vapor zone,
   means for defining a selected saturated vapor zone level for work product delivered to the vapor zone including
      means for generating a signal representative of the actual temperature at one of at least a plurality of spaced locations within said vessel,
      means for generating a signal representative of the desired temperature at the selected vertical location for a saturated vapor zone having a level selected for the work product being conveyed to the saturated vapor zone, and
      means for comparing the signals representative of the actual and desired temperatures at the selected vertical location and for varying the output of said heater means to change the actual sensed temperature to the desired temperature so that the actual saturated vapor zone level will conform to the desired saturated vapor zone level.

2. A vapor processing system according to claim 1, wherein said means for generating a signal representative of the actual temperature sensing means comprises a straight linear array of discrete thermocouple elements for sensing the actual temperature at a plurality of vertical locations.

3. A vapor processing system according to claim 2, wherein said straight linear array of discrete thermocouple elements is inclined from the vertical.

4. A vapor processing system according to claim 1, wherein said means for generating a signal representative of the desired temperature comprises selectable set point means.

5. A vapor processing system according to claim 1, wherein said means for generating a signal representative of the actual temperature comprises a pair of spaced thermocouple elements for transmitting signals representative of the actual temperatures at the two spaced locations and means for receiving the transmitted signals and for generating a signal representative of the actual temperature at at least a plurality of intermediate locations.

* * * * *